May 28, 1968     F. LLOYD     3,385,139
CABLE STRIPPING
Filed June 12, 1967     4 Sheets-Sheet 1
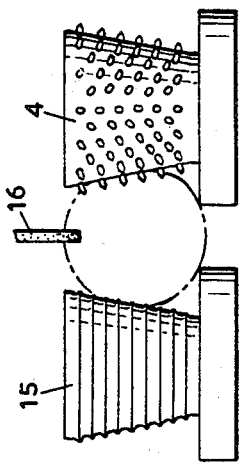
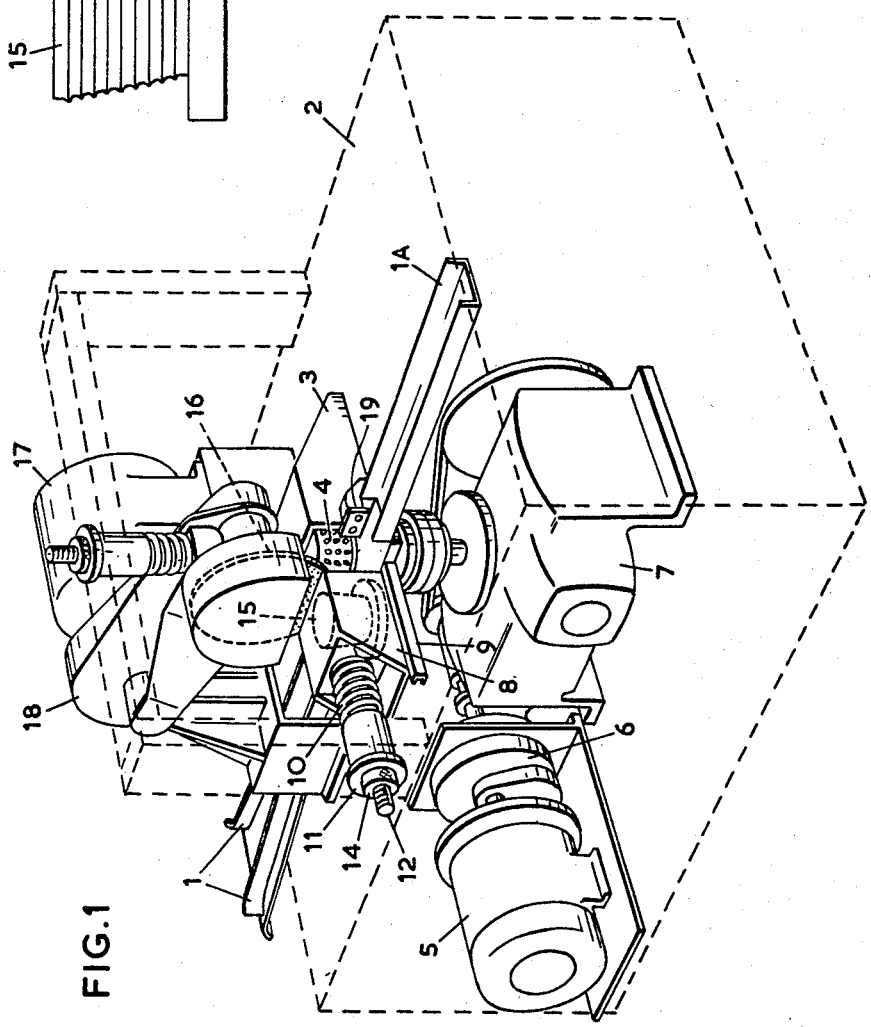
INVENTOR
Frank Lloyd
BY
Misegades & Dougl
ATTORNEYS

United States Patent Office 3,385,139
Patented May 28, 1968

3,385,139
CABLE STRIPPING
Frank Lloyd, Gateshead, England, assignor to The English Electric Company Limited, London, England, a British company
Filed June 12, 1967, Ser. No. 645,440
Claims priority, application Great Britain, June 10, 1966, 25,951/66
8 Claims. (Cl. 81—9.51)

ABSTRACT OF THE DISCLOSURE

This invention is concerned with a machine for use in stripping off one or more layers of a cable casing quickly and efficiently. The machine comprises racking means, preferably a spiked driving wheel with a cooperating pressure wheel, for gripping the cable and feeding it longitudinally past a cutter, preferably a lamina grinding wheel, which cuts a longitudinal groove in the cable casing, after which the material on opposite sides of the groove can be splayed apart to enable the casing to be pulled off the cable core.

---

It is often useful to strip off the casing of one or more layers of the casing of discarded cables in order to be able to recover and re-use the core material or casing material or both. The casing of the cable may for example have steel armour, it may be lead-covered, or it may simply consist of insulation. Various crude methods have been commonly used to strip cables. In contrast this invention is concerned with a machine which can be used to strip cables quickly and efficiently.

A machine according to this invention for use in stripping off one or more layers of a cable casing comprises racking means arranged to grip the cable and feed it longitudinally past a cutter which cuts a longitudinal groove in the cable casing, after which the material on opposite sides of the groove can be splayed apart to enable the casing to be pulled off the cable core.

The cutter preferably comprises a grinding wheel of the lamina type (i.e. of small thickness compared with its diameter) driven with its axis of rotation at right angles ot the axis of the cable. The grinding wheel may be spring-loaded towards the axis of the cable and the maximum depth of cut may be adjustable.

Preferably the racking means comprises a spiked driving wheel against which the cable is pressed by a spring-loaded pressure-wheel.

Figure 3:
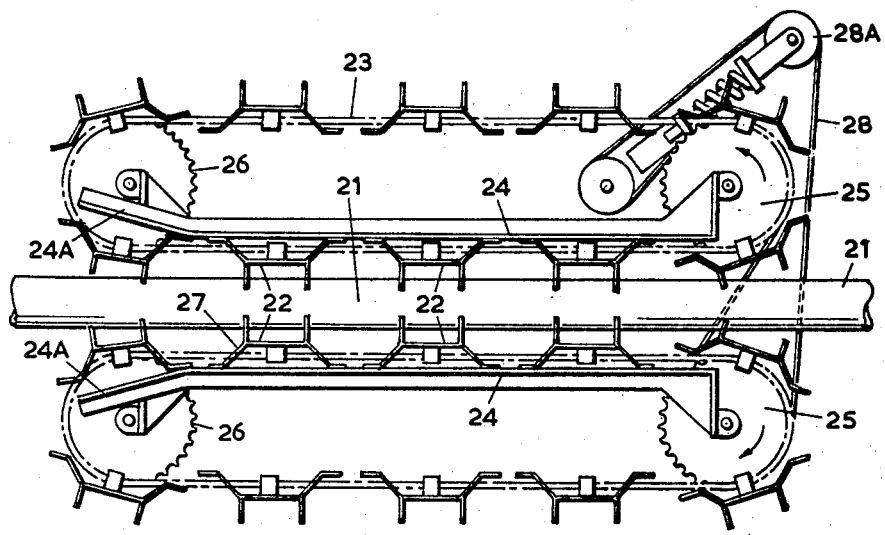
Figure 4:
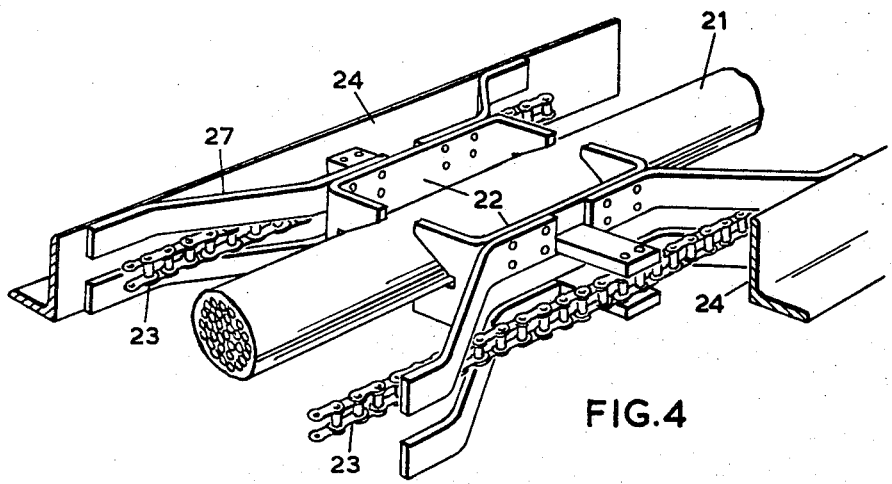
Figure 5:
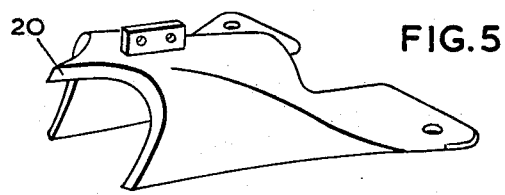
Figure 6:
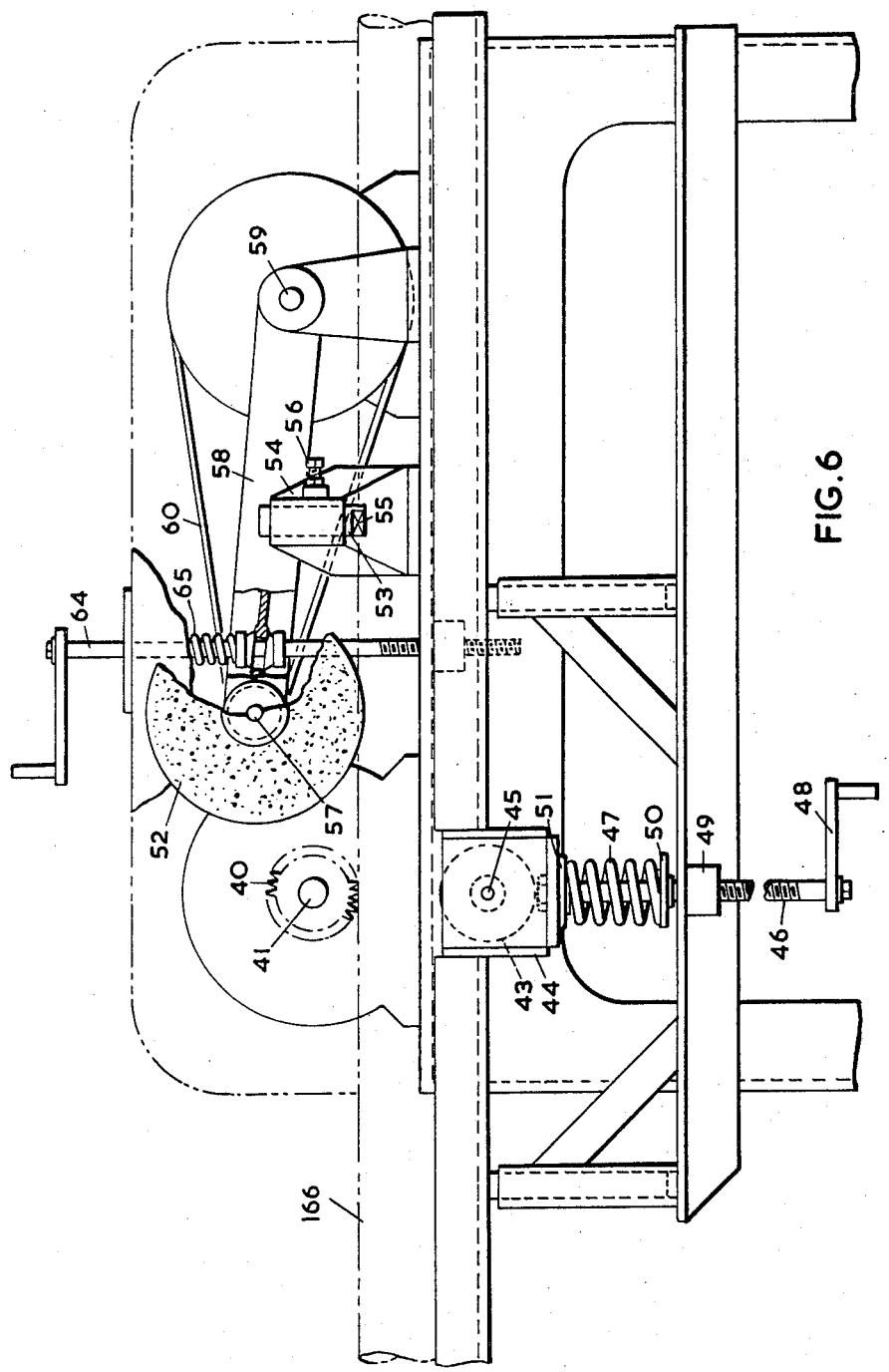
Figure 7:
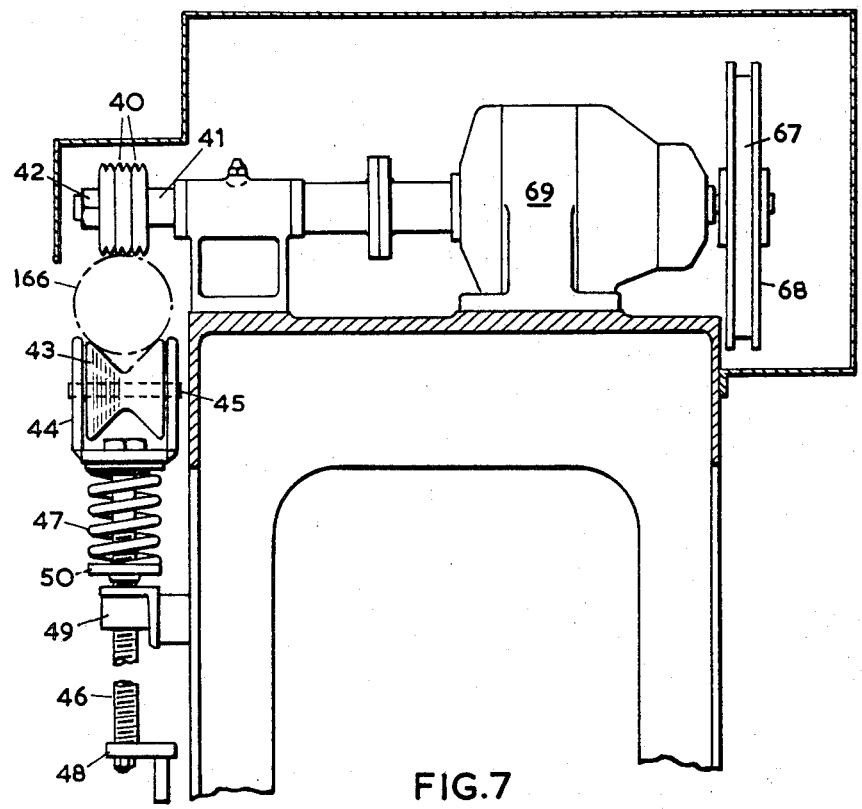
Figure 8:
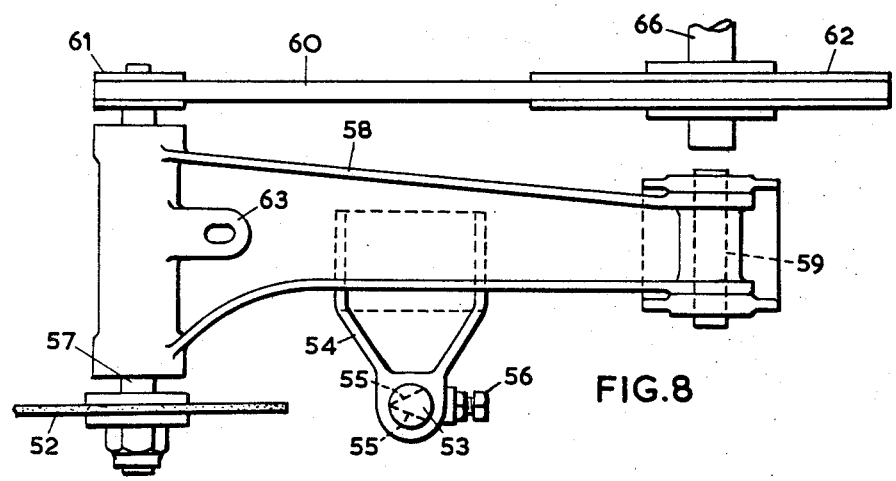

Examples of machines according to this invention are shown in the accompanying drawings. In these drawings:

FIG. 1 shows one example in perspective;
FIG. 2 is a fragmentary view of the main part of the racking means;
FIG. 3 is a plan view of an alternative form of racking means;
FIG. 4 is a fragmentary perspective view of the racking means shown in FIG. 3;
FIG. 5 is a perspective view of part of the machine which serves as a splaying device;
FIG. 6 is a side view of a second machine;
FIG. 7 is an end view of the machine shown in FIG. 6; and
FIG. 8 is a plan view of part of the machine shown in FIG. 6.

Referring to FIG. 1 of the drawings, horizontal guides 1 which support the cable (not shown) to be stripped are flared at one end to permit easy entry of the cable and are of adjustable width to accommodate cables of different diameters. The guides 1 are mounted on a table 2 (shown dotted for reasons of clarity) which serves as a chassis for the machine. A further guide 1A supports the cable after it has passed a racking head 3.

The racking head 3 includes a bracket and bearing supporting a tapered spiked driving wheel 4 (shown enlarged in FIG. 2). The wheel 4 is rotated by a motor 5 driving through a variable speed gearbox 6 and then through a belt or chain drive to a worm gearbox 7. A slipping clutch (not shown) may be incorporated in the drive system to the wheel 4 to guard against overloading of the motor 5. Opposite the racking head 3 is a pressure head 8 mounted in a slide 9 which permits the head 8 to move in a horizontal direction at right angles to the cable and to exert a pressure on the cable. The pressure is achieved by means of a spring 10, and is adjustable by means of screw 11 which varies the compression of the spring 10. A screwed rod 12, attached at one end to the pressure head 8, passes through the spring 10 and carries a nut 14 to limit the extent to which the spring 10 can force the head 8 towards the cable, thus controlling the gap between the pressure head 8 and the racking head 3 to facilitate the entry of cables of different diameters.

The pressure head 8 contains a tapered grooved wheel 15 (see particularly FIG. 2) which is free to rotate. The wheel 15 forces the cable into contact with the spikes on the driving wheel 4, the rotation of which causes the cable to move along the guides 1. The tapered nature of the wheels 4 and 15 forces the cable down against the lower flanges of the wheels and prevents bowing of the cable during the cutting action. The horizontal grooves in the wheel 15 further assist in keeping the cable pressed down in the guide.

The pressure head 8 and the racking head 3 in operation together constitute one form of racking means. The cable is cut longitudinally by means of a rotating grinding wheel 16 of the lamina type, i.e. of small width compared with its diameter. The wheel 16 rotates in a vertical plane approximately midway between the wheels 4 and 15 and is driven by an electric motor 17 via a V belt and pulley (not shown). The downward pressures and the depth of cut of the grinding wheel 16 are both adjusted by a spring and rod mechanism similar to that used for applying pressure to the pressure head 8, except that in this case the screwed rod forms a swinging link mounted on top of a drive casing 18 which is hinged on a fulcrum bracket about the motor shaft. The grinding wheel 16 is thus able to swing in a vertical plane about the motor shaft so as to accommodate any undulations in the cable.

A bracket 19 is provided for mounting a splaying device (not shown in FIG. 1) which the material of the cable on opposite sides of the cut are splayed apart. One form of such a splaying device is shown in FIG. 5 and can be seen to consist of a double plough having a sharpened leading edge 20. The plough is mounted in such manner that the edge 20 enters into the slot cut in the cable by the grinding wheel 16. The side surfaces defining the edge 20 are so shaped as to flatten out the cut portion of the cable as it is pushed past the plough.

The splaying device is not essential and may be omitted.

In operation the spacing between the guides 1 is adjusted to suit the diameter of the cable to be stripped, and the pressure exerted by the pressure head 8 and the minimum spacing between the wheels 4 and 15 are set by the adjustment screw 11 and the nut 14 respectively. The pressure and depth of cut of the grinding wheel 16 are adjusted in like manner, being dependent upon the dimensions and nature of the material or materials of the cable casing to be cut. The desired racking speed is obtained by adjustment of the variable speed gearbox 6.

FIGS. 3 and 4 show an alternative form of racking means which may be employed in place of the racking head 3 and the pressure head 8 in FIG. 1. A cable 21 (only part of which is shown) is gripped by clamps 22 which are attached to endless chains 23. The chains 23 pass between guides 24 and the cable 21, around driving sprockets 25 outside the guides 24, and around sprockets 26, before passing again between the guides 24. The clamps 22 are attached at intervals along the chains 23 and there are at least sufficient clamps to ensure that, before a clamp releases the cable at the outlet end (this action happening automatically as the clamp 22 leaves the guide 24 and passes over the driving sprocket 25), the adjacent following clamp has already passed the cutting means 16. The clamps 22 are clamped tightly to the cable by the wedging action provided by the converging entry portions 24A of the guides 24. The guides 24 are themselves adjustable in spacing by means not shown to accommodate different diameters of cable. Leaf springs 27 are mounted on the backs of the clamps 22 and serve both to exert pressure on the cable 21 throughout its journey between the guides 24 and to provide a degree of flexibility in the clamps 22 to accommodate irregularities in the cable diameter. One of the driving sprockets 25 is driven directly by the motor gearbox assembly 5, 6 and 7 shown in FIG. 1, and the other sprocket 25 is driven by a chain 28 from the first sprocket 25. A jockey sprocket 28A allows for different spacings between the guides 24, and reverses the direction of rotation of the second sprocket 25.

An alternative form of splaying device (not illustrated) which may be used in place of the device shown in FIG. 5 consists of a number of thin wheels with rims of tapered section rotatably mounted between fork arms on holders which are mounted on adjustable pushrods. The wheels lie in pairs forming V-shapes of progressively increasing angle which successively enter the slot cut on the cable and progressively splay apart the sides of the slot as the cable is moved along the line of wheel pairs.

The machine shown in FIG. 6 differs from the machine already described in that, where the machine of FIG. 1 has the axes of the wheels 4 and 15 of the racking means lying vertically, the machine in FIG. 6 has the axes of the wheels lying horizontally. As shown particularly in FIG. 7, the spiked driving wheel is formed by six spiked discs 40 secured to a drive shaft 41 by a nut 42. The wheel 43, which forms part of a pressure head for pressing the cable 166 against the driving wheel, differs from the wheel 15 in FIG. 2 in that it has a V-shaped section at its periphery. With this arrangement there is no need to make any adjustments when accommodating cables of different diameter; the centre of the cable is automatically aligned with the centres of the two wheels of the racking means in a vertical plane. The cable is located laterally by engagement with the flanks of the V of the wheel 43.

The pressure head consists of the wheel 43, a yoke 44 in which the wheel is mounted by a pin 45, and a screw-threaded rod 46 which allows for adjustment of the pressure applied to the wheel 43 by a compression spring 47. The rod 46 carries a handle 48 by which the rod can be screwed up and down in a threaded bush 49. The spring 47 is compressed between a disc 50 on the rod and a disc 51 secured beneath the yoke 44.

It will be seen that the grinding wheel 52 in this case must be offset from the racking means along the length of the cable. The cable is fed into the machine from the left, as viewed in FIG. 6, and is pushed past the grinding wheel by the racking means.

Behind the grinding wheel there is a splaying device consisting simply of a rod 53 which is carried by a bracket 54 and which is formed with facets 55 at its lower end. These facets form in effect a plough which splays apart the sides of the slot cut in the cable casing by the grinding wheel. The vertical position of the rod 53 can be adjusted by loosening a set screw 56 and sliding the rod 53 vertically into the desired position. The height of the rod must of course be set in accordance with the diameter of the cable being stripped.

As in the previous example, the splaying device may be omitted, the splaying apart of the cable casing being done in this case separately by hand or with the aid of a separate machine.

As shown in FIG. 8, the grinding wheel 52 is mounted on a drive shaft 57 which rotates in bearings at the left-hand end of a lever 58; at the right-hand end of the lever 58 a spindle 59 serves as a fulcrum about which the lever can swing up and down to the appropriate height for cables of different diameters. The grinding wheel is driven by a belt 60 which passes over pulleys 61 and 62 respectively on the drive shaft 57 and on a shaft 66 of an electric motor (not shown), the shaft 66 being co-axial with the spindle 59.

The spiked driving wheel is driven by the electric motor via a pulley on the other end of the shaft 66, a belt, and a variable ratio gear box (none of which are shown), and via a belt 67 which is driven by the variable ratio gear box and which drives the shaft 41 (see FIG. 7) via a pulley 68 and a reduction gear box 69.

Downward pressure is applied to the grinding wheel via a lug 63 by a vertically adjustable screw-threaded rod 64 bearing on a spring 65 in the same manner as the rod 46 applies upward pressure to the yoke 51.

The teeth of the driving wheel formed by the spiked discs 40 may be continuously cleaned by means of a comb consisting of a plate of which one edge is shaped to form teeth extending into the gaps between the teeth of the driving wheel.

In order to make possible the simultaneous stripping of two cables, the machine shown in FIGS. 6 to 8 may be constructed with two cable-stripping channels lying side by side. For this purpose for example, the reduction gear box 69 may conveniently be replaced by one having output shafts extending out of both ends to drive two separate racking means at the same speed. The grinding wheel for the second stripping channel may, however, be mounted on a separate lever like the lever 58, with a separate belt drive from a pulley mounted on the motor shaft 66 at the end opposite to the pulley 62.

I claim:
1. A machine for stripping a cable casing, comprising racking means for gripping a cable and feeding it longitudinally, and a cutter for cutting a longitudinal groove in a cable casing as a cable is forced therepast by the racking means, said cutter comprising a narrow grinding wheel, said grinding wheel being mounted upon a laterally extending shaft, a fixed driving pulley having a laterally extending axis, a driving belt extending between said driving pulley and said shaft, a lever pivotable about said laterally extending axis also extends between said driving pulley and said shaft and carries said shaft, whereby the position of said grinding wheel may be varied to vary the depth of cut.

2. A machine according to claim 1 in which the racking means comprises a spiked driving wheel against which the cable is pressed by a pressure head comprising a wheel which bears against the cable and lies with its axis parallel to the axis of the driving wheel.

3. A machine according to claim 2, in which the wheel of the pressure head has a V-shaped section at its periphery to locate the cable laterally.

4. A machine according ot claim 1, in which the racking means comprises a spiked driving wheel against which the cable is pressed by a pressure head comprising a wheel which bears against the cable and lies with its axis parallel to the axis of the driving wheel, and in which the axis of rotation of the grinding wheel is parallel to the axis of rotation of the driving wheel of the racking means.

5. A machine according to claim 4, in which the two axes of rotation are horizontal.

6. A machine according to claim 4, in which the wheel of the pressure head has a V-shaped section at its periphery to locate the cable laterally.

7. A machine for stripping off a cable casing, comprising means for supporting the cable horizontally while permitting the cable to move longitudinally; racking means for moving the cable in the said longitudinal direction and comprising a rackng wheel and a pressure wheel lying with their axes horizontal and extending laterally across the cable, one wheel being above the cable and the second wheel being beneath the cable and directly below the first wheel, the racking wheel having a spiked periphery and being motor driven, and the pressure wheel being resiliently urged towards the cable and having a V-shaped section around its periphery whereby the cable seats in the V and is thereby laterally centralised; and including cutting means for cutting a longitudinal groove in the cable casing and comprising a rotary cutting wheel mounted at one end of a substantially horizontal lever with the axis of rotation of the cutting wheel parallel to the axes of the wheels of the racking means and spaced along the cable whereby the racking means feeds the cable longitudinally towards and past the cutting wheel, the lever being substantially parallel to the cable and being pivotally mounted at its end remote from the cutting wheel about a pivotal axis lying horizontally and at right angles to the cable, whereby the vertical position of the cutting wheel can be varied by means of piovtal movement of the lever about its pivotal axis, the cutting wheel being driven via belt means engaging around one pulley which is coaxially coupled to the cutting wheel and a second pulley on a motor-driven shaft having an axis of rotation coinciding with the pivotal axis of the lever.

8. A machine for use in stripping off a cable casing, comprising racking means for gripping the cable and feeding it longitudinally, a cutter comprising a lamina grinding wheel for cutting a longitudinal groove in the cable casing as the cable is forced past the cutter by the racking means, a lever rotatably mounting at one end the grinding wheel, a driving pulley situated at the opposite end of the lever, a driven pulley coupled to the grinding wheel, belt-like means transmitting a rotary drive from the driving pulley to the driven pulley, and means pivotally mounting the lever about an axis coincident with the axis of rotation of the driving pulley whereby the depth of cut of the grinding wheel is varied by moving the lever about its pivotal axis.

References Cited

UNITED STATES PATENTS

| | | | |
|---|---|---|---|
| 1,052,271 | 2/1913 | Pessin | 81—9.51 |
| 1,435,721 | 11/1922 | McIntosh et al. | 51—401 X |
| 1,929,915 | 10/1933 | Deitz et al. | 81—9.51 |
| 1,969,517 | 8/1934 | Malloy | 81—9.51 X |
| 2,396,442 | 3/1946 | Shaver et al. | |
| 2,485,518 | 10/1949 | Vermette | 81—9.51 |
| 2,960,128 | 11/1960 | Uhlenkott | 144—208 |
| 3,316,781 | 5/1967 | Bignell et al. | 81—9.51 |

MILTON S. MEHR, *Primary Examiner.*